United States Patent Office 3,226,420
Patented Dec. 28, 1965

3,226,420
1,4-DISUBSTITUTED-2,3,5,6-TETRACYANO BENZENE COMPOUNDS AND PROCESS FOR PREPARATION THEREOF
Owen Wright Webster, Wilmington, Del., assignor to E. I. du Pont de Nemours and Company, Wilmington, Del., a corporation of Delaware
No Drawing. Filed Feb. 14, 1963, Ser. No. 258,619
6 Claims. (Cl. 260—465)

This invention is concerned with new compositions of matter and more particularly with a group of three closely related organic chemical compounds, as well as a process for their preparation.

The compounds of this invention are the 1,4-disubstituted-2,3,5,6-tetracyanobenzenes in which the substituents are chloro or amino. These compounds may be represented by the formula

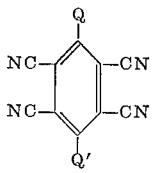

in which Q and Q' may be —Cl or —NH$_2$. The three compounds embraced by this formula are 1,4-diamino-2,3,5,6-tetracyanobenzene, 1-amino-4-chloro-2,3,5,6-tetracyanobenzene, and 1,4 - dichloro - 2,3,5,6-tetracyanobenzene.

These compounds are prepared in a sequential process as follows. First, 1,1,2,2-tetracyanoethane is treated with a mixture of an alkali metal acetate and acetic acid to form 1,4-diamino-2,3,5,6-tetracyanobenzene. This compound is in turn treated with an alkali metal nitrite and hydrochloric acid to obtain a mixture of 1 - amino - 4 - chloro-2,3,5,6-tetracyanobenzene and 1,4-dichloro-2,3,5,6-tetracyanobenzene. Further treatment of 1 - amino-4-chloro-2,3,5,6-tetracyanobenzene with an alkali metal nitrite and hydrochloric acid converts it to 1,4-dichloro-2,3,5,6-tetracyanobenzene.

The first step of the process of this invention, viz, the reaction of 1,1,2,2-tetracyanoethane with a mixture of an alkali metal acetate and acetic acid, may be carried out in the temperature range of 0° to 200° C., temperatures in the range from 17° to 140° C. being preferred. This reaction can be carried out in the presence of water in an amount up to about 5% by weight of the alkali metal acetate being employed. However, best yields of product are obtained under substantially anhydrous conditions, and this represents a preferred practice. This is accomplished by using anhydrous reactants as well as by the use of otherwise inert dehydrating media such as acetic anhydride. The process may be carried out in the presence of air. However, improved yields of product are obtained if molecular oxygen is essentially absent, and this represents the preferred practice. Substantial absence of oxygen is readily obtained by carrying out the reaction under an inert atmosphere such as nitrogen, helium, argon, or the like, or by operating in a vacuum. Pressure is not critical in this reaction. It may be carried out at pressures both above and below atmospheric, with atmospheric pressure being preferred for convenience.

The proportions in which the reactants may be brought together to carry out the first step of the process of this invention may be varied widely, the primary requirement being that at the time of reaction they be in intimate contact, preferably in liquid (solution) phase. The function of the alkali metal acetate is not fully understood, but the use of very small catalytic amounts of it is insufficient for carrying out the process. For each mole of 1,1,2,2-tetracyanoethane there should be employed at least 0.1 mole of the alkali metal acetate, and proportions from this amount up to 20 moles of the acetate per mole of tetracyanoethane cover the preferred range. Acetic acid should be employed in an amount of at least one mole per mole of 1,1,2,2-tetracyanoethane, and proportions up to 20 moles of acetic acid and higher per mole of tetracyanoethane are operable, a molecular excess of acetic acid over tetracyanoethane being preferred since the excess acetic acid serves as a convenient solvent in which to carry out the reaction. As alkali metal acetate there may be employed lithium acetate, sodium acetate, potassium acetate, rubidium acetate, cesium acetate, and the like or mixtures of these.

In the second step of the process of this invention, the treatment of 1,4-diamino-2,3,5,6-tetracyanobenzene with an alkali metal nitrite and hydrochloric acid might be expected to stop with diazotization of one or both of the amine groups. However, it has been discovered that, instead, there is first formed 1-amino-4-chloro-2,3,5,6-tetracyanobenzene which on continuation of the same treatment is converted to 1,4-dichloro-2,3,5,6-tetracyanobenzene. The molar amounts of nitrite and hydrochloric acid may be the same or different, and proportions from one mole of nitrite and one mole of hydrochloric acid for 20 moles of 1,4-diamino-2,3,5,6-tetracyanobenzene to 20 moles of nitrite and 20 moles of hydrochloric acid per mole of 1,4-diamino-2,3,5,6-tetracyanobenzene may be employed. The nitrite and hydrochloric acid are conveniently employed in aqueous solutions. It is generally preferred to use concentrations in the range from 0.01 N to 6 N. To improve the contact of the reactants, this step of the reaction may be carried out in the presence of an added water-miscible organic solvent, such as acetonitrile, which is otherwise inert to the reactants and products. As alkali metal nitrite there may be employed lithium nitrite, sodium nitrite, potassium nitrite, rubidium nitrite, or cesium nitrite.

Since water is always present in the second step of the process, this step is best carried out at temperatures in the range of 0° to 100° C. Pressure is not critical and pressures both above and below atmospheric pressure may be used, atmospheric pressure being preferred for convenience.

In the following examples parts are by weight, and Example II represents a preferred embodiment.

*Example I*

A solution of 7,343 parts of glacial acetic acid, 2,174 parts of acetic anhydride, and 2,000 parts of potassium acetate is refluxed for one hour under an atmosphere of nitrogen. The solution is then cooled to room temperature and 1,300 parts of 1,1,2,2-tetracyanoethane is added. The solution is heated to reflux for 15 minutes and cooled to room temperature. The reaction mixture is diluted with ether and filtered. The orange fluorescent filtrate is diluted further with petroleum ether and allowed to stand for 12 hours at room temperature. Red-orange crystals of 1,4-diamino-2,3,5,6-tetracyanobenzene (30 parts) are collected by filtration. After recrystallization from acetonitrile, this compound decomposes in air without melting at 275° C.

*Analysis.*—Calcd. for $C_{10}N_4N_6$: C, 57.7; H, 1.94; N, 40.3; M.W., 208. Found: C, 58.2; H, 2.35; N, 40.2; M.W., 211.

IR: 3400, 3300, 3200, 2200, 1630, 1280 cm.$^{-1}$.

UV: $\lambda_{max.}^{CH_3CN}$ 498 m$\mu$ ($\epsilon=6,930$), 288 m$\mu$ ($\epsilon=7,570$) 263 m$\mu$ ($\epsilon=17,940$).

Example II

To a solution of 8,000 parts of freshly fused potassium acetate in 68,185 parts of glacial acetic acid and 8,696 parts of acetic anhydride cooled at 0° C. is added portionwise over 30 minutes 13,000 parts of 1,1,2,2-tetracyanoethane with stirring under a blanket of nitrogen. The temperature rises spontaneously to about 15° C. and the solution becomes dark. Stirring is continued at 0° C. for one hour and then at room temperature for 24 hours. The dark mixture is taken to dryness on a rotary evaporator, 50,000 parts of distilled water is added, and the mixture is stirred rapidly until no further dissolving takes place. A diatomaceous earth filter aid is added and the mixture is filtered. The filter cake is dried in vacuo, suspended in 19,570 parts of acetonitrile, and the slurry is chromatographed over 91,200 parts of alumina (Woelm). Elution with acetonitrile and concentration of the washings yield 372 parts of 1,4-diamino-2,3,5,6-tetracyanobenzene in the form of deep red microcrystals which decompose in air without melting at about 275° C. In solution in acetonitrile or dimethyl sulfoxide this amine is reddish orange with strong fluorescence.

Example III

To a stirred suspension of 95 parts of 1,4-diamino-2,3,5,6-tetracyanobenzene in 7,828 parts of acetonitrile and about 1,100 parts of 6 N hydrochloric acid is added gradually over one-half hour a solution of 300 parts of sodium nitrite in 1,000 parts of water. The reaction mixture is then heated at 50° C. for one-half hour. On dilution with 100,000 parts of water, 87 parts of a mixture of 1,4-dichloro-2,3,5,6-tetracyanobenzene and 1-amino-4-chloro-2,3,5,6-tetracyanobenzene precipitates. This solid is dissolved in a minimum amount of ethylene dichloride (saturated solution) and placed on a chromatograph column of about 5,000 parts of alumina (Woelm, acid activity 1) made up in ethylene dichloride, the column having a height to diameter ratio of about 6. The column is washed with a solution of 2% ethyl acetate in ethylene chloride. This elutes 1,4-dichloro-2,3,5,6-tetracyanobenzene which is recovered (53 parts) by evaporation of the solvent. The column is then washed with ethylene dichloride containing increasing proportions of ethyl acetate up to 50%. This elutes the yellow band of 1-amino-4-chloro-2,3,5,6-tetracyanobenzene which is recovered (10 parts) from the solvent by evaporation.

1,4-dichloro-2,3,5,6-tetracyanobenzene is purified by recrystallization from ethylene chloride. In a sealed tube this compound decomposes without melting at 329° C.

*Analysis.*—Calcd. for $C_{10}Cl_2N_4$: C, 48.7; Cl, 28.7; N, 22.7. Found: C, 48.9; Cl, 28.4; N. 22.7.

IR: $\lambda_{max.}^{KBr}$ 4.45, 7.12, 7.23, 8.00, 8.15, 8.33, and 12.83$\mu$.

UV: $\lambda_{max.}^{CH_3CN}$ 354 m$\mu$ ($\epsilon=5,630$), 339 m$\mu$ ($\epsilon=3,980$) 269 m$\mu$ ($\epsilon=10,620$), 260 m$\mu$ ($\epsilon=11,610$), 253 m$\mu$ ($\epsilon=13,350$), 240 m$\mu$ ($\epsilon=46,900$), and 232 m$\mu$ ($\epsilon=71,200$).

1-amino-4-chloro-2,3,5,6-tetracyanobenzene is recrystallized from ethylene chloride. In a sealed tube this compound decomposes without melting at 330° C.

*Analysis.*—Calcd. for $C_{10}H_2ClN_5$: C, 52.7; H, 0.88; N, 30.9. Found: C, 52.9; H, 1.05; N, 30.0.

IR: $\lambda_{max.}^{KBr}$ 2.85, 2.97, 3.07, 4.47, 6.06, 6.35, 6.90, 7.79, and 12.00$\mu$.

UV: $\lambda_{max.}^{CH_3CN}$ 432 m$\mu$ ($\epsilon=7,720$), 275 m$\mu$ ($\epsilon=9,300$) 260 m$\mu$ ($\epsilon=28,200$), and 222 m$\mu$ ($\epsilon=39,300$).

Example IV

A suspension of 125 parts of 1,4-diamino-2,3,5,6-tetracyanobenzene in 3,131 parts of acetonitrile and 2,200 parts of 6 N hydrochloric acid is cooled to 0° C. and a solution of 600 parts of sodium nitrite in 3,000 parts of water is slowly added. After about one hour 100 parts of yellow solid is collected by filtration and dried. An infrared spectrum of this solid shows it consists mainly of 1-amino-4-chloro-2,3,5,6 - tetracyanobenzene. This product is treated with additional sodium nitrite and hydrochloric acid under the conditions described in Example III. By means of chromatography, also as in Example III, 20 parts of 1,4-dichloro-2,3,5,6-tetracyanobenzene is isolated as well as one part of recovered 1-amino-4-chloro-2,3,5,6-tetracyanobenzene.

The products of this invention are all useful for preparing pyromellitonitrile, an intermediate useful in the preparation of phthalocyanine dyes as shown in British Patent 698,049.

Example V

To a cold suspension of 35 parts of 1,4-diamino-2,3,5,6-tetracyanobenzene in 2,825 parts of dry nitromethane is added 42 parts of solid nitrosyl fluoroborate in one portion. After stirring for 30 minutes, the orange-red diamine is completely dissolved leaving a yellow-tan solution. About 300 parts of 50% aqueous hypophosphorus acid is added in one portion, and the mixture is stirred overnight at room temperature. The mixture is diluted with a saturated salt solution, and the organic layer is separated and dried. The solvent is removed from this layer under vacuum, and the residue is taken up in ethyl acetate and chromatographed on neutral alumina (Woelm). Elution with ethyl acetate gives a yellow solution which is then evaporated to dryness. The solid product is recrystallized from methanol to yield 16 parts of pyromellitonitrile melting at 260–263° C. in a sealed tube. It is identical in all respects with an authentic sample of pyromellitonitrile prepared by dehydration of pyromellitotetraamide.

1-amino-4-chloro-2,3,5,6-tetracyanobenzene and 1,4-dichloro-2,3,5,6-tetracyanobenzene are also readily converted to pyromellitonitrile. First, 1-amino-4-chloro-2,3,5,6-tetracyanobenzene is converted to 1,4-dichloro-2,3,5,6-tetracyanobenzene according to the procedure of Example IV. Chlorine is removed from 1,4-dichloro-2,3,5,6-tetracyanobenzene by mild hydrogenation using hydrogen in the presence of Pd-on-charcoal hydrogenation catalyst. Under these conditions the chlorine is replaced with hydrogen and the cyano groups are undisturbed, yielding pyromellitonitrile.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Compound of the formula

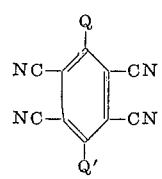

wherein Q and Q' each is selected from the group consisting of —Cl and —$NH_2$.

2. 1,4-diamino-2,3,5,6-tetracyanobenzene.
3. 1-amino-4-chloro-2,3,5,6-tetracyanobenzene.
4. 1,4-dichloro-2,3,5,6-tetracyanobenzene.
5. Process for the preparation of 1,4-diamino-2,3,5,6- tetracyanobenzene which comprises contacting and reacting, at a temperature in the range 0° C. to 200° C., 1,1,2,2-tetracyanoethane with an alkali metal acetate and acetic acid, said alkali metal acetate being present in an amount of at least 0.1 mole per mole of said tetracyanoethane.

6. Process which comprises contacting and reacting, at a temperature in the range 17° C. to 140° C., under substantially anhydrous conditions, and in the essential absence of molecular oxygen, 1,1,2,2-tetracyanoethane with an alkali metal acetate and acetic acid to produce 1,4-diamino-2,3,5,6-tetracyanobenzene, said alkali metal acetate being present in an amount of at least 0.1 mole per mole of tetracyanoethane, reacting, at a temperature in the range 0° C. to 100° C., the resultant diamino tetracyanobenzene with an alkali metal nitrite and hydrochloric acid, and recovering as the result thereof a compound of the formula

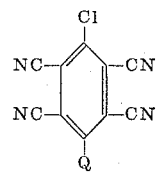

wherein Q is selected from the group consisting of —Cl and —NH$_2$.

References Cited by the Examiner

Blatt: Organic Syntheses, 1943, Collective Volume II, pp. 130–131.

CHARLES B. PARKER, *Primary Examiner*.